US008936269B1

(12) United States Patent  (10) Patent No.: US 8,936,269 B1
Liu  (45) Date of Patent: Jan. 20, 2015

(54) RETRACTABLE FRAME STRUCTURE FOR TANDEM TRAILER

(76) Inventor: Cheh-Kang Liu, Taipei (TW)

( * ) Notice: Subject to any disclaimer, the term of this patent is extended or adjusted under 35 U.S.C. 154(b) by 370 days.

(21) Appl. No.: 13/482,072

(22) Filed: May 29, 2012

(51) Int. Cl.
    *B62B 7/02* (2006.01)
(52) U.S. Cl.
    USPC ........................................ 280/656; 280/204
(58) Field of Classification Search
    CPC ...... B62K 27/003; B62K 27/02; B62K 27/12; B62B 7/12; B62B 7/126
    USPC ......... 280/638, 781, 789, 639, 645, 651, 656, 280/657, 658, 43.1, 40, 641, 204, 650, 280/415.1
    See application file for complete search history.

(56) References Cited

U.S. PATENT DOCUMENTS

| | | | |
|---|---|---|---|
| 5,020,814 A * | 6/1991 | George et al. | 280/204 |
| 5,249,823 A * | 10/1993 | McCoy et al. | 280/656 |
| 5,474,316 A * | 12/1995 | Britton | 280/204 |
| 5,577,746 A * | 11/1996 | Britton | 280/204 |
| 5,669,618 A * | 9/1997 | Chiu | 280/204 |
| 5,695,208 A * | 12/1997 | Baechler et al. | 280/204 |
| 5,785,333 A * | 7/1998 | Hinkston et al. | 280/204 |
| 5,829,770 A * | 11/1998 | Chiu | 280/204 |
| 5,829,771 A * | 11/1998 | Hsu | 280/204 |
| 5,921,571 A * | 7/1999 | Bell | 280/204 |
| 5,947,497 A * | 9/1999 | Hsu | 280/204 |
| 5,979,921 A * | 11/1999 | Derven et al. | 280/204 |
| 5,984,332 A * | 11/1999 | Beaudoin et al. | 280/204 |
| 6,053,518 A * | 4/2000 | Chiu | 280/204 |
| 6,705,628 B2 * | 3/2004 | Kahmann | 280/204 |
| 6,896,275 B1 * | 5/2005 | Liu | 280/204 |
| 6,959,938 B1 * | 11/2005 | Liu | 280/204 |
| 7,052,026 B2 * | 5/2006 | Sutherland | 280/204 |
| 7,168,761 B2 * | 1/2007 | Britton et al. | 297/250.1 |
| 7,172,206 B2 * | 2/2007 | Staszak | 280/204 |
| 7,341,265 B1 * | 3/2008 | Liu | 280/204 |
| 7,354,058 B2 * | 4/2008 | Chou | 280/651 |
| 7,387,310 B1 * | 6/2008 | Liu | 280/642 |
| 7,845,664 B2 * | 12/2010 | Rodgers | 280/204 |
| 8,006,992 B2 * | 8/2011 | Britton | 280/204 |
| 8,226,102 B2 * | 7/2012 | Liu | 280/204 |
| 8,240,695 B1 * | 8/2012 | Liu | 280/503 |
| 8,444,173 B1 * | 5/2013 | Liu | 280/656 |
| 2002/0050700 A1 * | 5/2002 | Stohr et al. | 280/650 |
| 2002/0074764 A1 * | 6/2002 | Allen et al. | 280/204 |
| 2002/0096857 A1 * | 7/2002 | Valdez et al. | 280/293 |
| 2002/0163158 A1 * | 11/2002 | Durrin | 280/204 |
| 2003/0067138 A1 * | 4/2003 | Kahmann | 280/415.1 |
| 2006/0017264 A1 * | 1/2006 | Chou | 280/651 |
| 2006/0273555 A1 * | 12/2006 | Morgan et al. | 280/656 |
| 2007/0284842 A1 * | 12/2007 | O'Donnell | 280/204 |
| 2010/0078912 A1 * | 4/2010 | Chang et al. | 280/204 |
| 2010/0244405 A1 * | 9/2010 | Assaf | 280/415.1 |
| 2012/0091689 A1 * | 4/2012 | Liu | 280/476.1 |

\* cited by examiner

*Primary Examiner* — Brodie Follman
(74) *Attorney, Agent, or Firm* — Jackson IPG PLLC

(57) ABSTRACT

A retractable frame structure for tandem trailer includes a bottom frame, which allows adjustment between an extended position for two-seat seating arrangement in a fore-to-aft manner and a retracted position for one-seat seating arrangement, a front frame and a rear frame detachably coupled together and respectively pivotally connected to the front and rear sides of the bottom frame for allowing collapsing of the tandem trailer to reduce space occupation when the tandem trailer is not in use, two wheel brackets respectively bilaterally mounted at the rear side of the bottom frame for supporting a respective wheel, and a trailer bar pivotally connected to one lateral side of the bottom frame for coupling to a bicycle.

6 Claims, 22 Drawing Sheets

US 8,936,269 B1

RETRACTABLE FRAME STRUCTURE FOR TANDEM TRAILER

BACKGROUND OF THE INVENTION

1. Field of the Invention

The present invention relates to bicycles and more particularly, to tandem trailers and more particularly, to a retractable frame structure for tandem trailer that allows adjustment of the bottom frame thereof between an extended position for two-seat seating arrangement in a fore-to-aft manner and a retracted position for one-seat seating arrangement.

2. Description of the Related Art

A conventional trailer, for example, U.S. Pat. No. 6,959,938B1, is known comprising: a bottom frame, two wheel holder frames respectively affixed to said side bars to support a respective wheel, a trailer bar pivotally connected to one front lateral side of the bottom frame and linked to a bicycle, and a seat for the sitting of a young child. When a young child is sitting on the seat, the bicycle can be propelled to drag the trailer. According to this conventional design, the space defined in the frame structure of the trailer is not adjustable, and therefore only one single seat is provided for one child to sit thereon.

Further, U.S. Pat. No. 7,341,265A, issued to the same inventor of the aforesaid prior at trailer, discloses a frame structure for foldable baby trailer. According to this design, the bottom frame of the frame structure for foldable baby trailer is transversely retractable between an extended position for operation and a received position to save space occupation conveniently for storage and delivery.

SUMMARY OF THE INVENTION

The present invention has been accomplished under the circumstances in view. It is the main object of the present invention to provide a retractable frame structure for tandem trailer, which allows adjustment of the bottom frame thereof between an extended position for two-seat seating arrangement in a fore-to-aft manner and a retracted position for one-seat seating arrangement.

It is another object of the present invention to provide a retractable frame structure for tandem trailer, which, when not in use, enables the front frame and the rear frame to be collapsed and received to the bottom frame to reduce the dimension convenient for packing, delivery or storage.

DETAILED DESCRIPTION OF THE INVENTION

Figure 1:
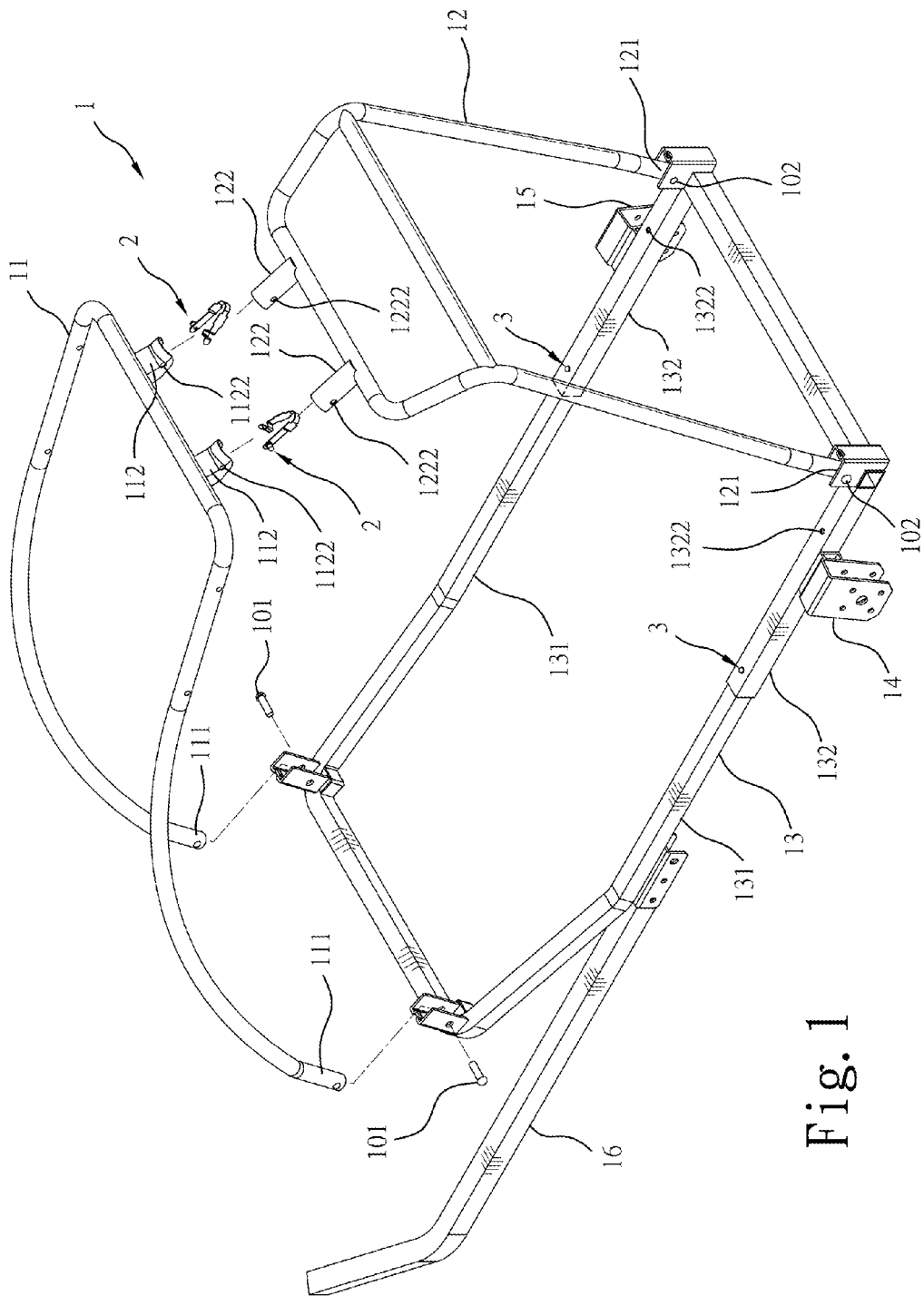
FIG. 1 is an exploded view of a retractable frame structure for tandem trailer in accordance with the present invention.
Figure 2:
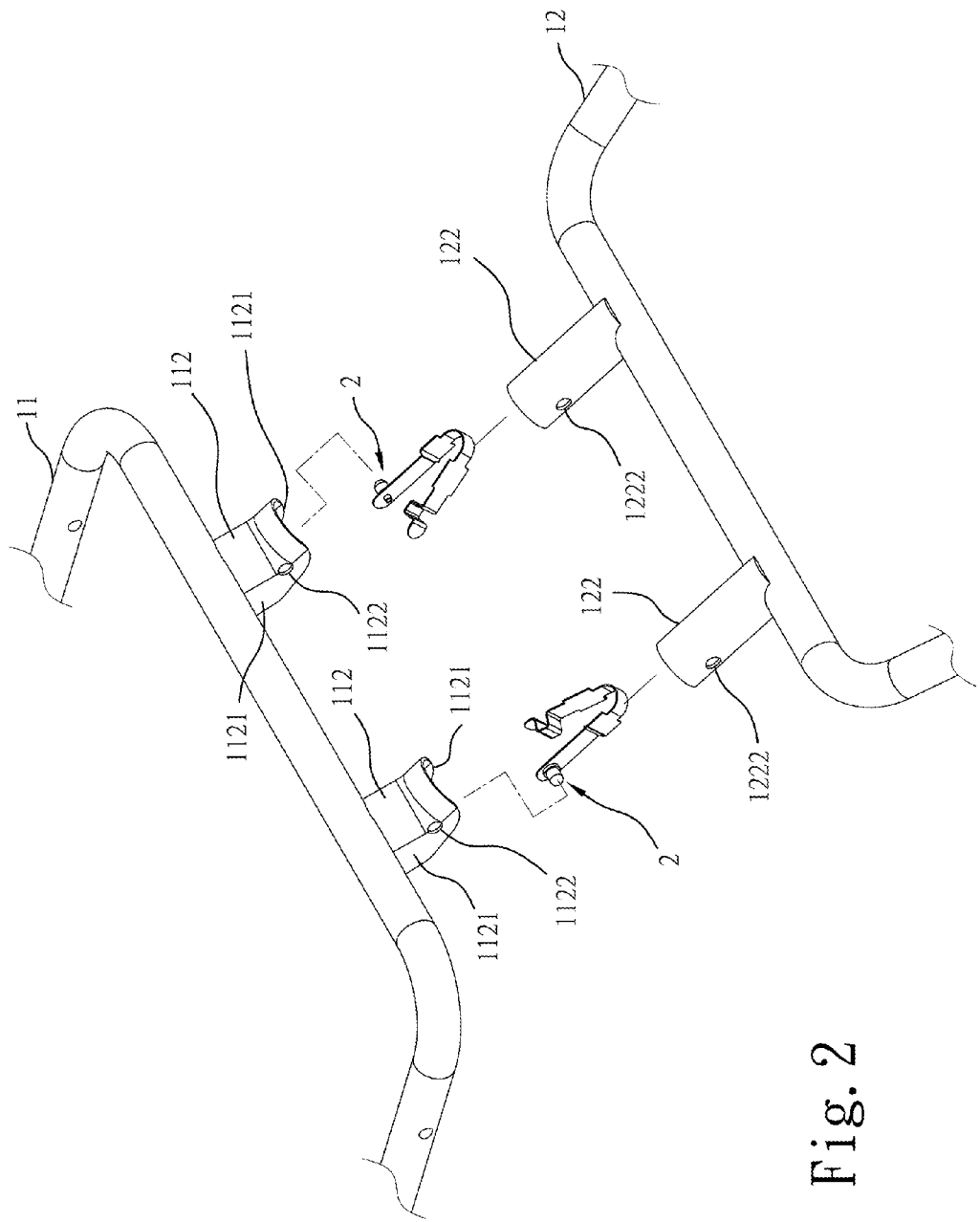
FIG. 2 is an exploded view, in an enlarged scale, of a part of the retractable frame structure for tandem trailer in accordance with the present invention, illustrating the coupling structure between the front frame and the rear frame.

Referring to FIGS. 1-12, a retractable frame structure 1 for tandem trailer in accordance with the present invention is shown comprising a front frame 11, a rear frame 12, a bottom frame 13, two wheel brackets 14;15 respectively bilaterally mounted at the bottom frame 13 near its rear side for supporting a respective wheel (not shown), and a trailer bar 16 connected to one lateral side of the bottom frame 13 near its front side for coupling to a bicycle (not shown).

The main features of the retractable frame structure for tandem trailer are outlined hereinafter.

The front frame 11 has the respective bottom ends 111 of two side bars thereof (see FIG. 1 and FIG. 2) respectively pivotally connected to the two distal ends of the front side of the bottom frame 13 by a respective pivot member 101 so that the front frame 11 can be biased forwards and backwards relative to the bottom frame 13, and the top side thereof pivotally connected to the rear frame 12.

The rear frame 12 has the respective bottom ends 121 of two side bars thereof (see FIG. 1 and FIG. 3) respectively pivotally connected to the two distal ends of the rear side of the bottom frame 13 by a respective pivot member 102 so that the rear frame 12 can be biased forwards and backwards relative to the bottom frame 13, and a top side thereof pivotally connected to the top side of the front frame 11.

The bottom frame 13 is a substantially rectangular open frame retractable back and forth in the longitudinal direction between an extended position and a retracted position. When in the extended position, the bottom frame 13, the front frame 11 and the rear frame 12 define a relatively greater accommodation space for two-seat seating arrangement in a fore-to-aft manner (see FIG. 3 and FIG. 6). When in the retracted position, the distance between the front frame 11 and the rear frame 12 is relatively reduced, and the bottom frame 13, the front frame 11 and the rear frame 12 define a relatively smaller accommodation space for one-seat seating arrangement (see FIG. 9 and FIG. 12).

Figure 3:
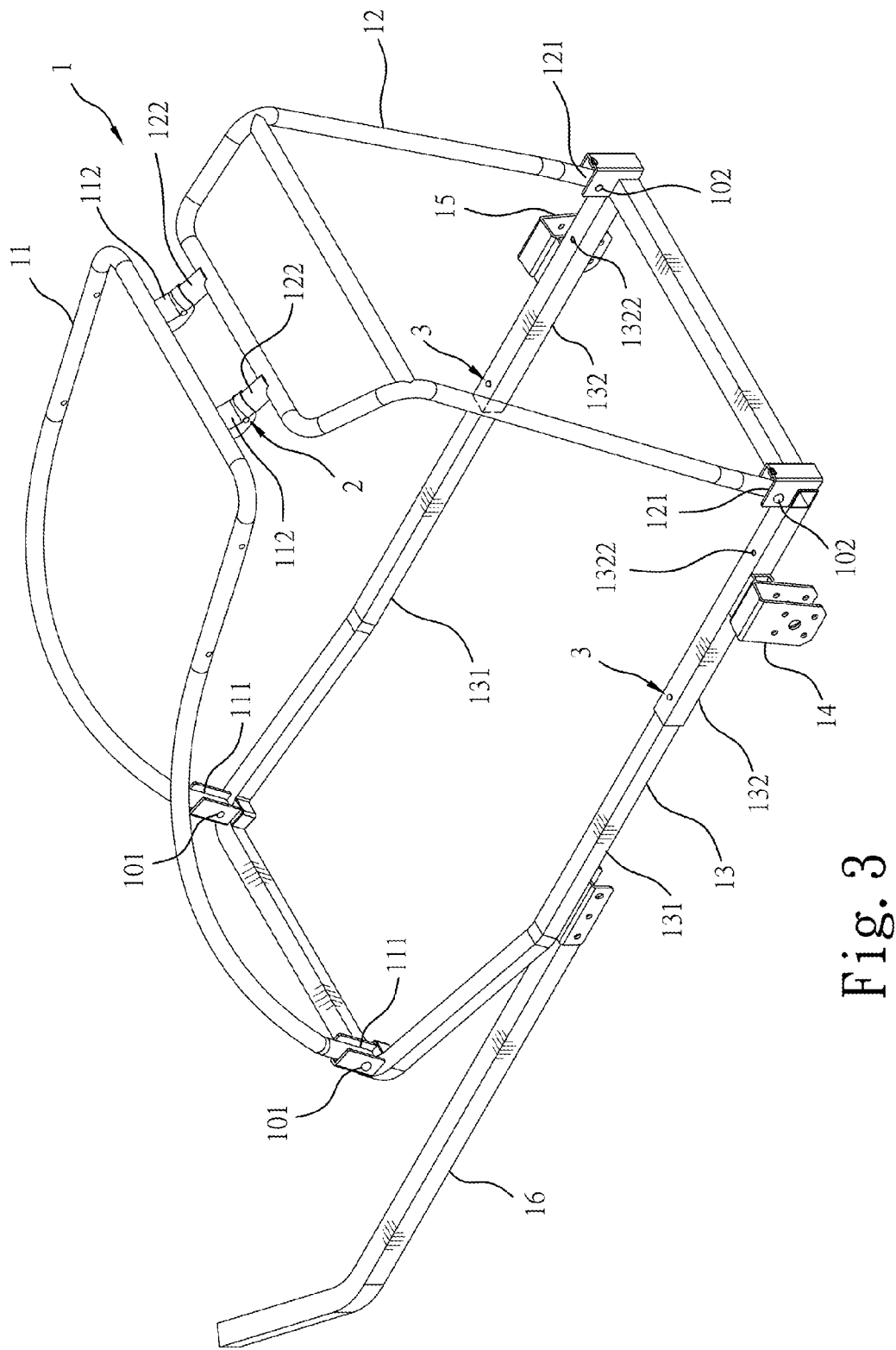
FIG. 3 is an elevational assembly view of the retractable frame structure for tandem trailer in accordance with the present invention.
Figure 4:
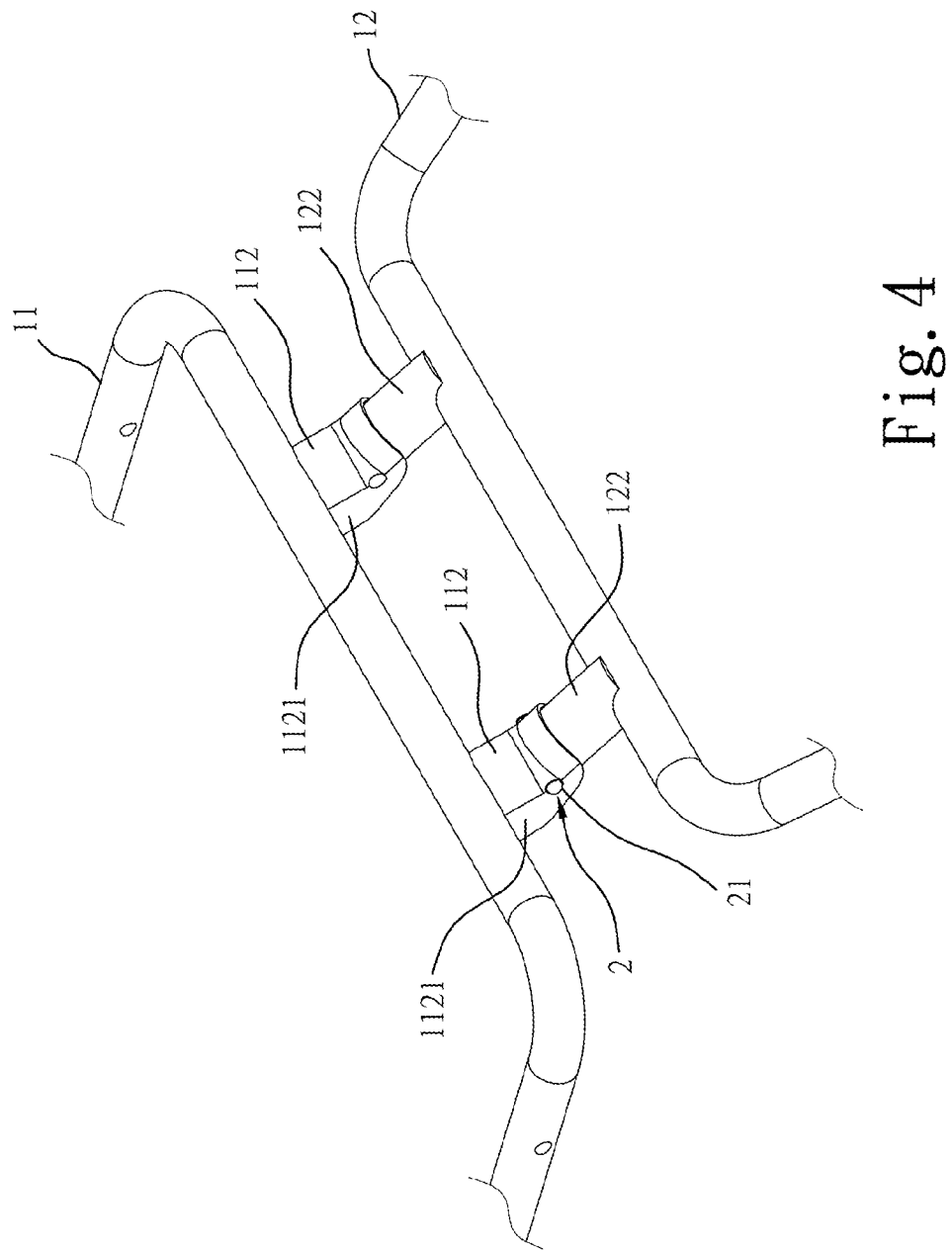
FIG. 4 is an assembly view of FIG. 2.
Figure 5:
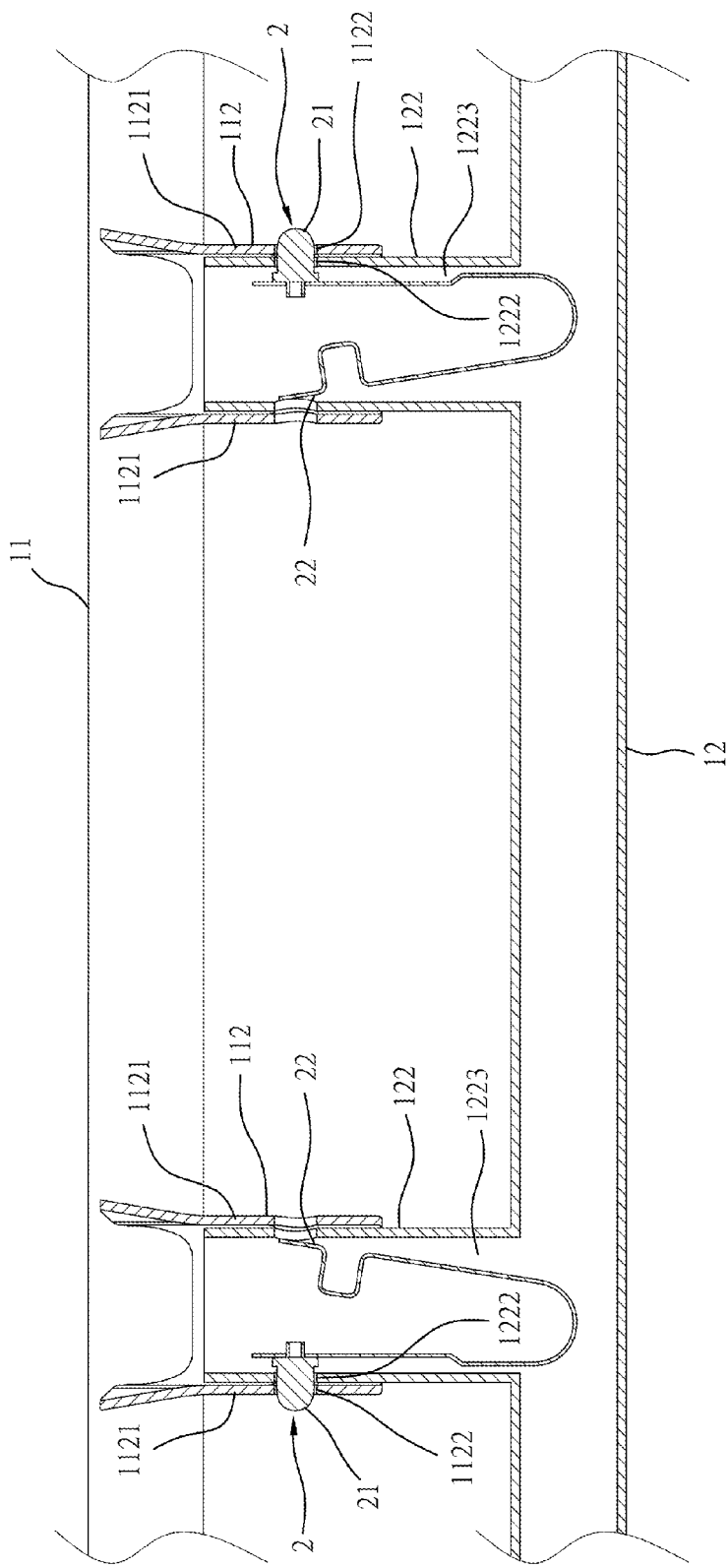
FIG. 5 is a sectional top view, in an enlarged scale, of FIG. 4.
Figure 14:
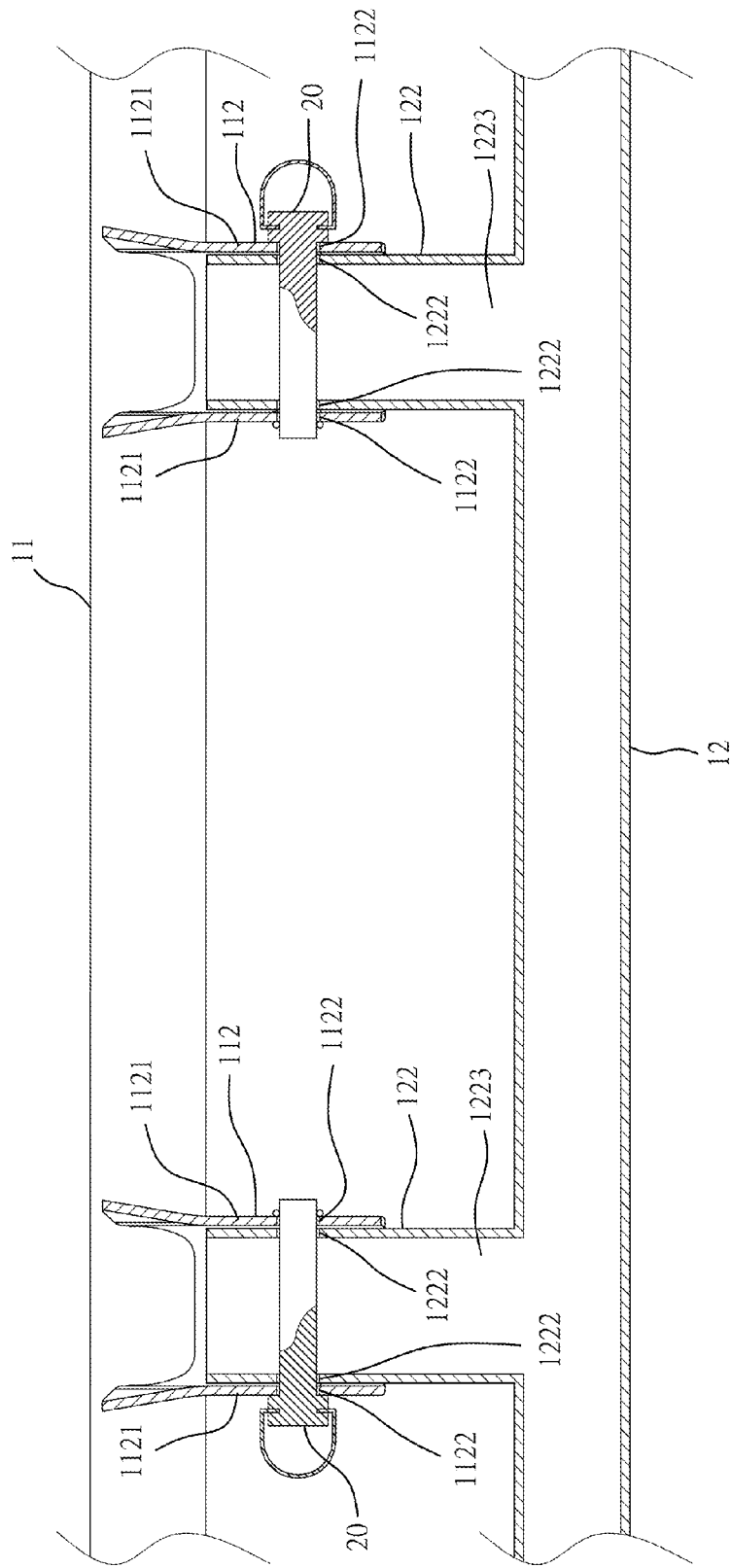
FIG. 14 corresponds to FIG. 5, illustrating the use of lock pins for the first locking devices.
Figure 15:
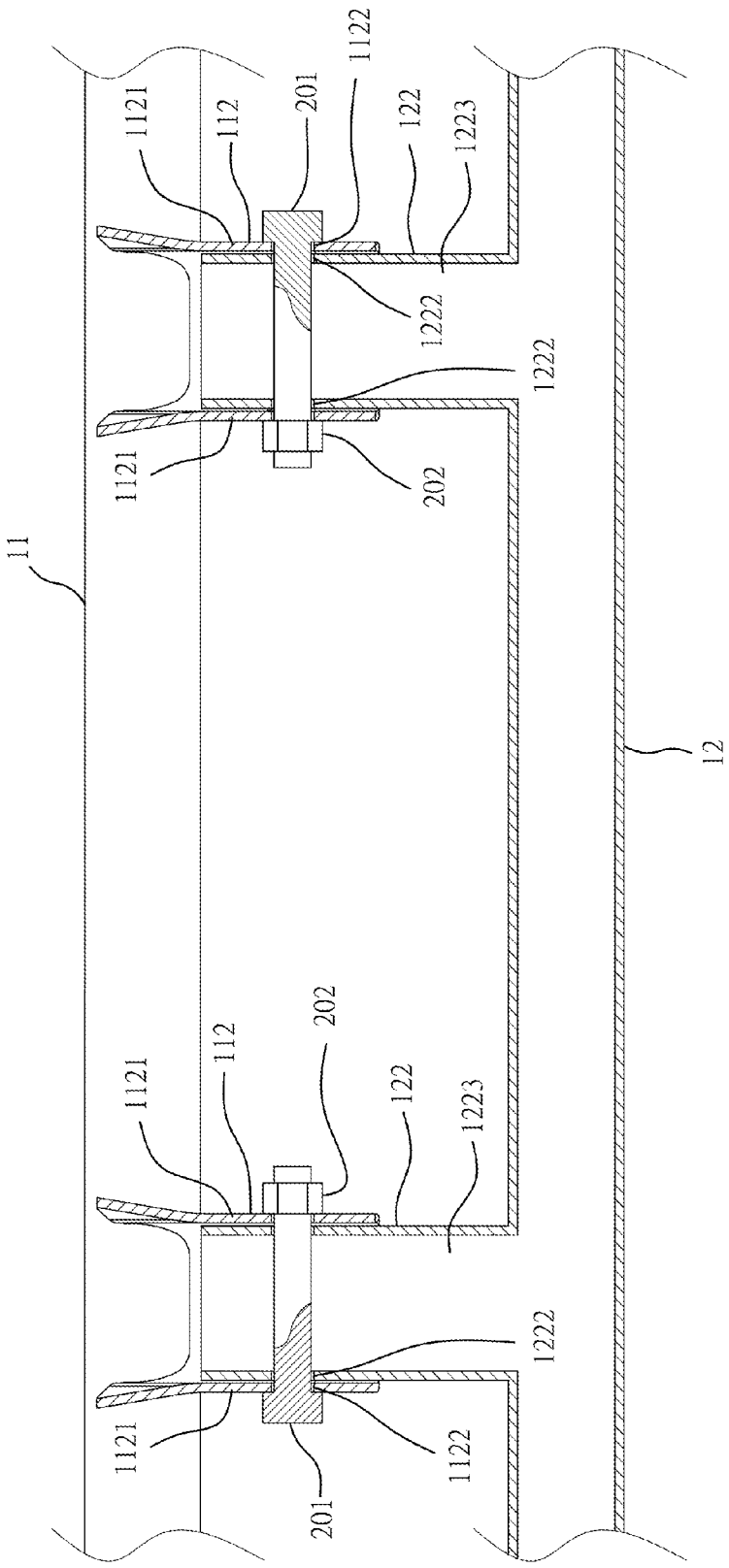
FIG. 15 corresponds to FIG. 5, illustrating the use of screw bolts and nuts for the first locking devices.
Figure 16:
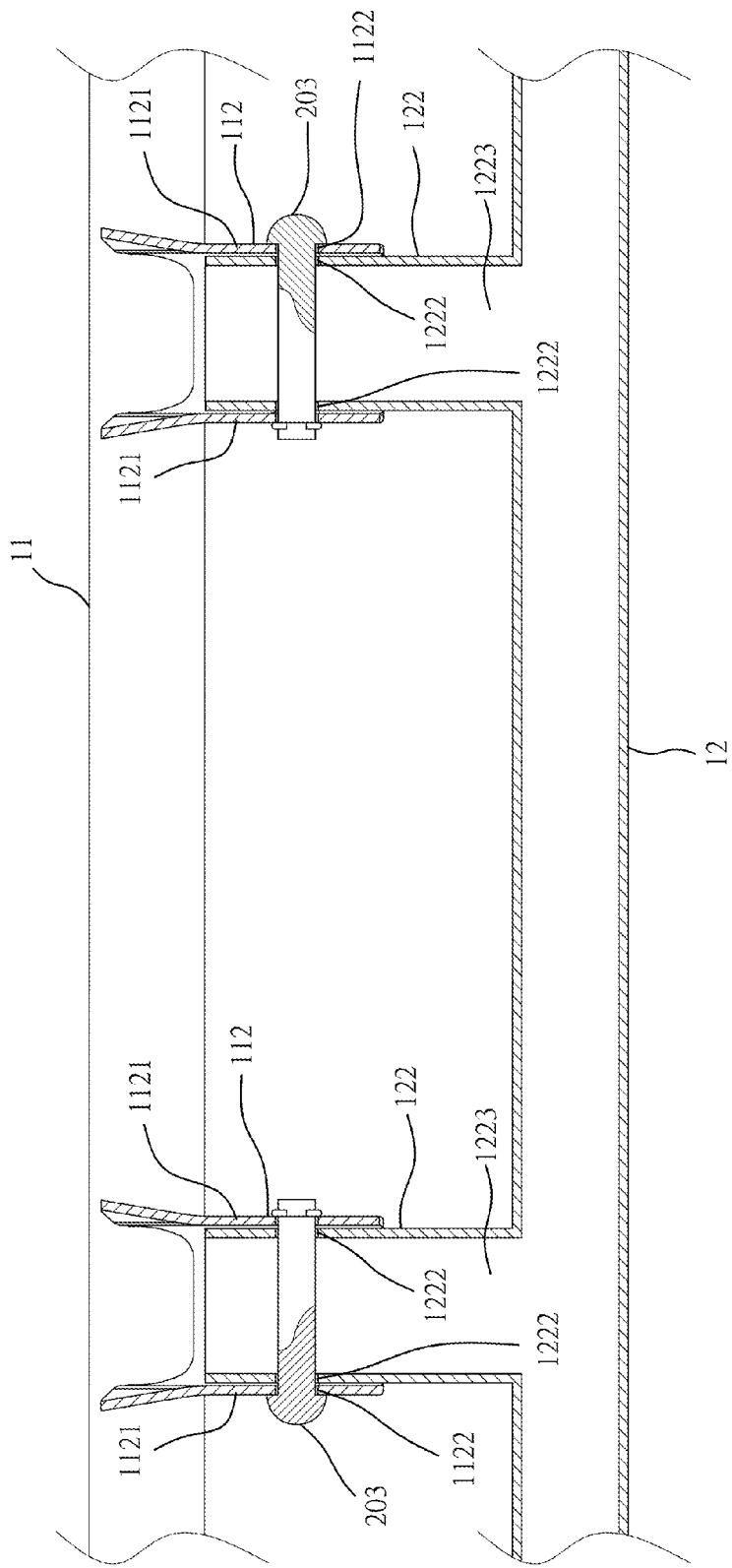
FIG. 16 corresponds to FIG. 5, illustrating the use of rivets for the first locking devices.
Figure 17:
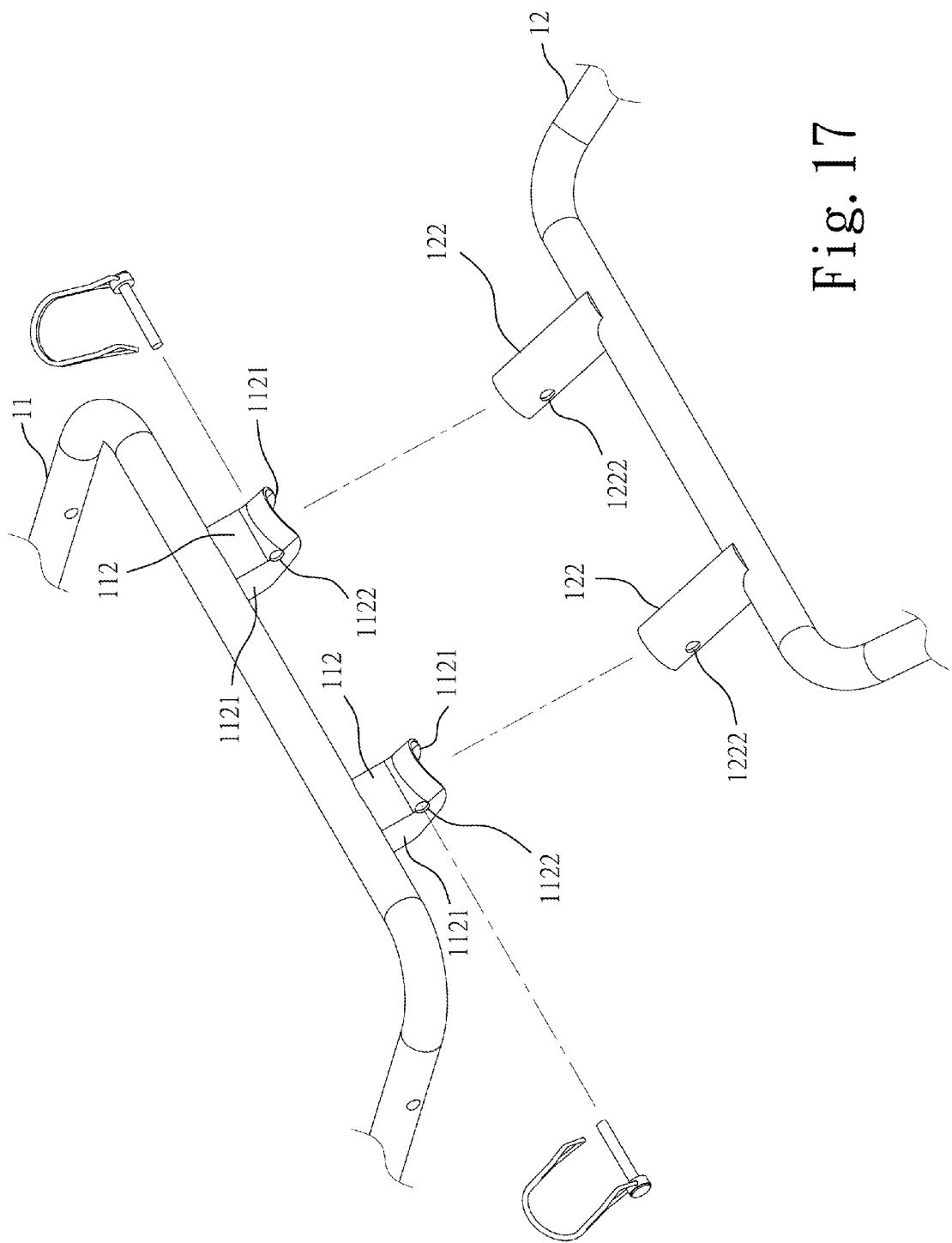
FIG. 17 corresponds to FIG. 2, illustrating the use of safety pins for the first locking devices.
Figure 18:
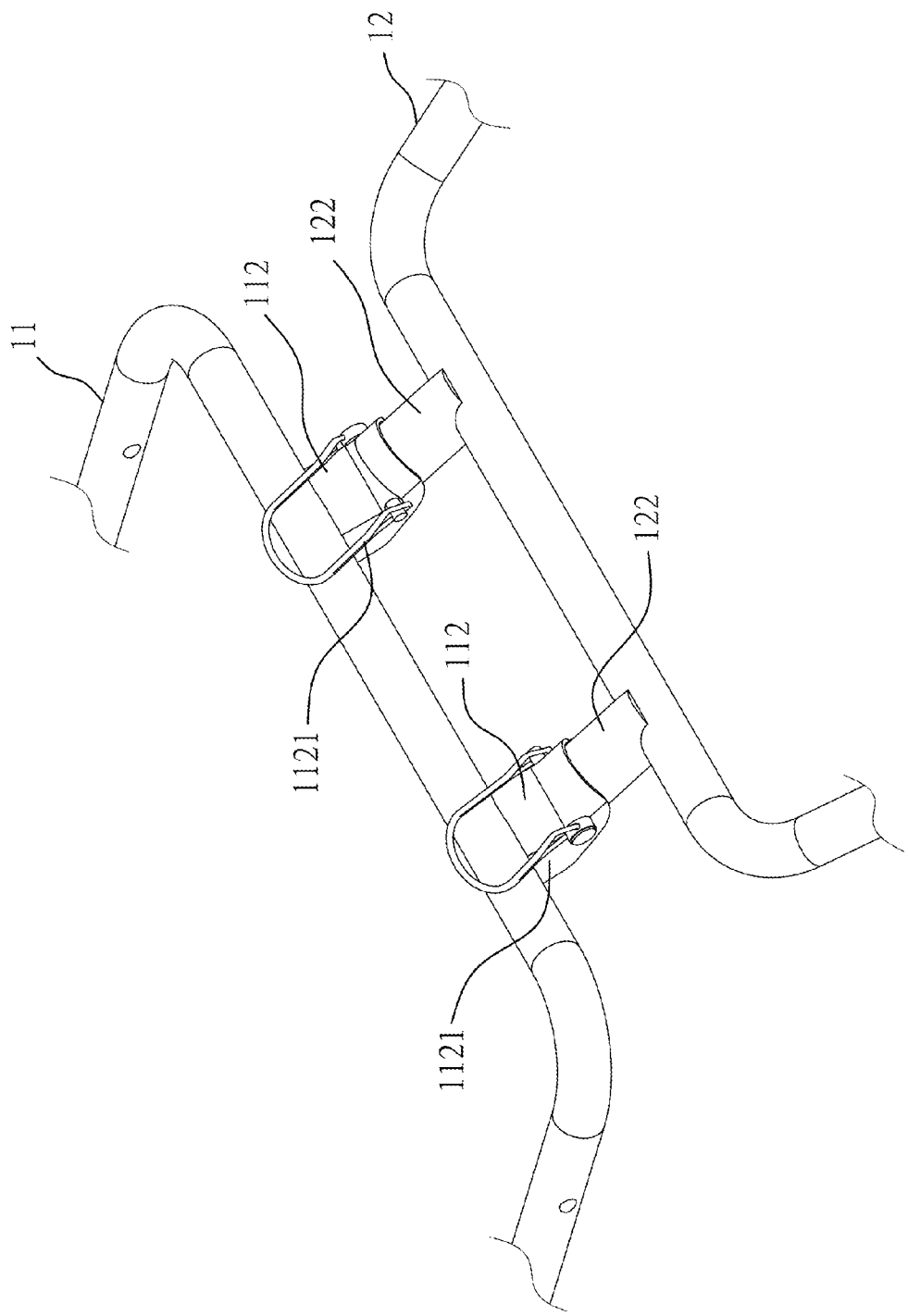
FIG. 18 is an assembly view of FIG. 17.

Further, the front frame 11 comprises at least one coupling portion 112 located on the top side thereof (see FIGS. 2-5); the rear frame 12 comprises at least one coupling portion 122 located on the top side thereof and respectively detachably fastened to the at least one coupling portion 112 of the front frame 11 by a respective first locking device, for example, elastic positioning pin 2 (see FIG. 4 and FIG. 5). In this embodiment, each coupling portion 112 of the front frame 11 comprises two opposite sidewalls 1121 and a through hole 1122 located on each sidewall 1121 (see FIG. 2 and FIG. 5); each coupling portion 122 of the rear frame 12 comprises an axial hole 1223 (see FIG. 5) and at least one transverse through hole 1222 extending across the axial hole 1223; the elastic positioning pin 2 is mounted in the axial hole 1223 of the respective coupling portion 122 of the rear frame 12, having its one end positioned in one side inside the respective coupling portion 122 and its other end provided with a retaining rod 21 that is inserted through one transverse through hole 1222 of the respective coupling portion 122 and engaged into the through hole 1122 on each sidewall 1121 of the respective coupling portion 112 of the front frame 11 (see FIG. 5). Alternatively, as shown in FIG. 14, the aforesaid first locking device can be a lock pin 20 inserted through the through hole 1122 on each sidewall 1121 of the respective coupling portion 112 of the front frame 11 and the one transverse through hole 1222 of the respective coupling portion 122 of the rear frame 12 to lock the front frame 11 and the rear frame 12 together. Alternatively, as shown in FIG. 15, the aforesaid first locking device can be comprised of a screw bolt 201 and a nut 202, wherein the screw bolt 201 is inserted through the through hole 1122 on each sidewall 1121 of the respective coupling portion 112 of the front frame 11 and the one transverse through hole 1222 of the respective coupling portion 122 of the rear frame 12 and then screwed up with the nut 202 to lock the front frame 11 and the rear frame 12 together. Alternatively, as shown in FIG. 16, the aforesaid first locking device can be a rivet 203 inserted through the through hole 1122 on each sidewall 1121 of the respective coupling portion 112 of the front frame 11 and the one transverse through hole 1222 of the respective coupling portion 122 of the rear frame 12 and then riveted thereto to lock the front frame 11 and the rear frame 12 together. Alternatively, as shown in FIGS. 17 and 18, the aforesaid first locking device can be a safety pin 20 inserted through the through hole 1122 on each sidewall 1121 of the respective coupling portion 112 of the front frame 11 and the one transverse through hole 1222 of the respective coupling portion 122 of the rear frame 12 and then fastened thereto to lock the front frame 11 and the rear frame 12 together. Further, a conventional quick-release device may be used to substitute for the aforesaid first locking device, achieving the same effect.

Figure 19:
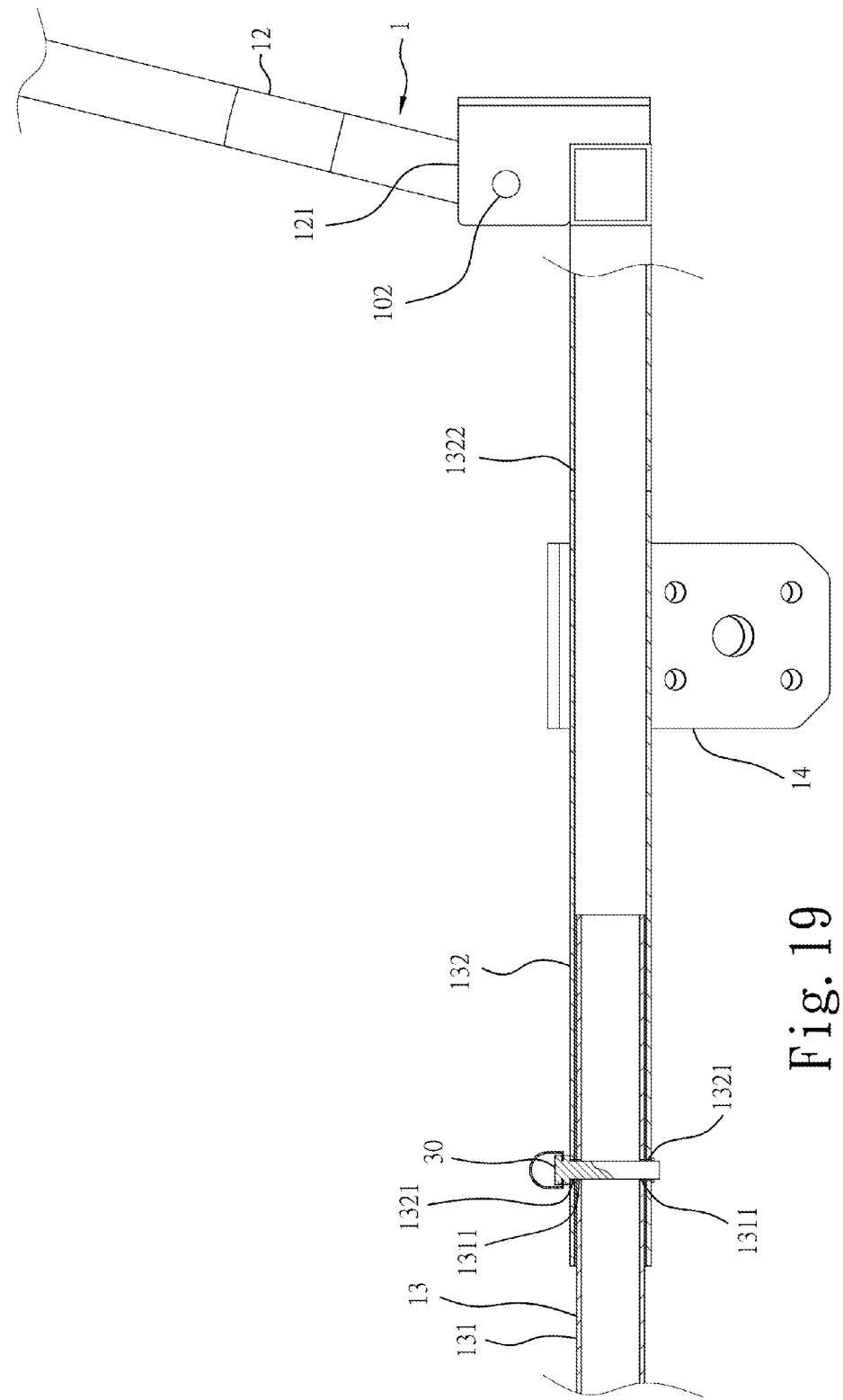
FIG. 19 is similar to FIG. 7, illustrating the use of a lock pin for the second locking device.
Figure 20:
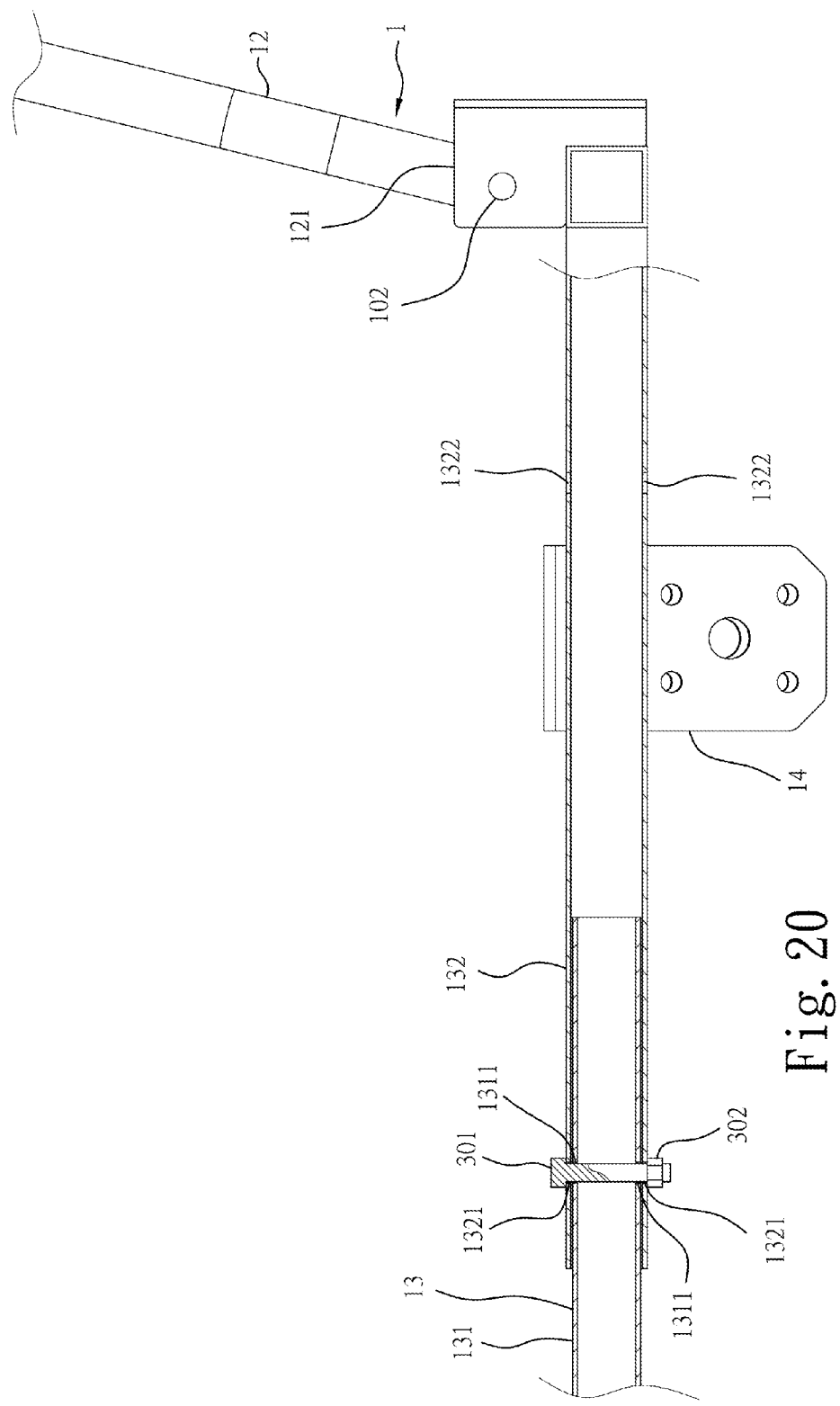
FIG. 20 is similar to FIG. 7, illustrating the use of a screw bolt and a nut for the second locking device.
Figure 21:
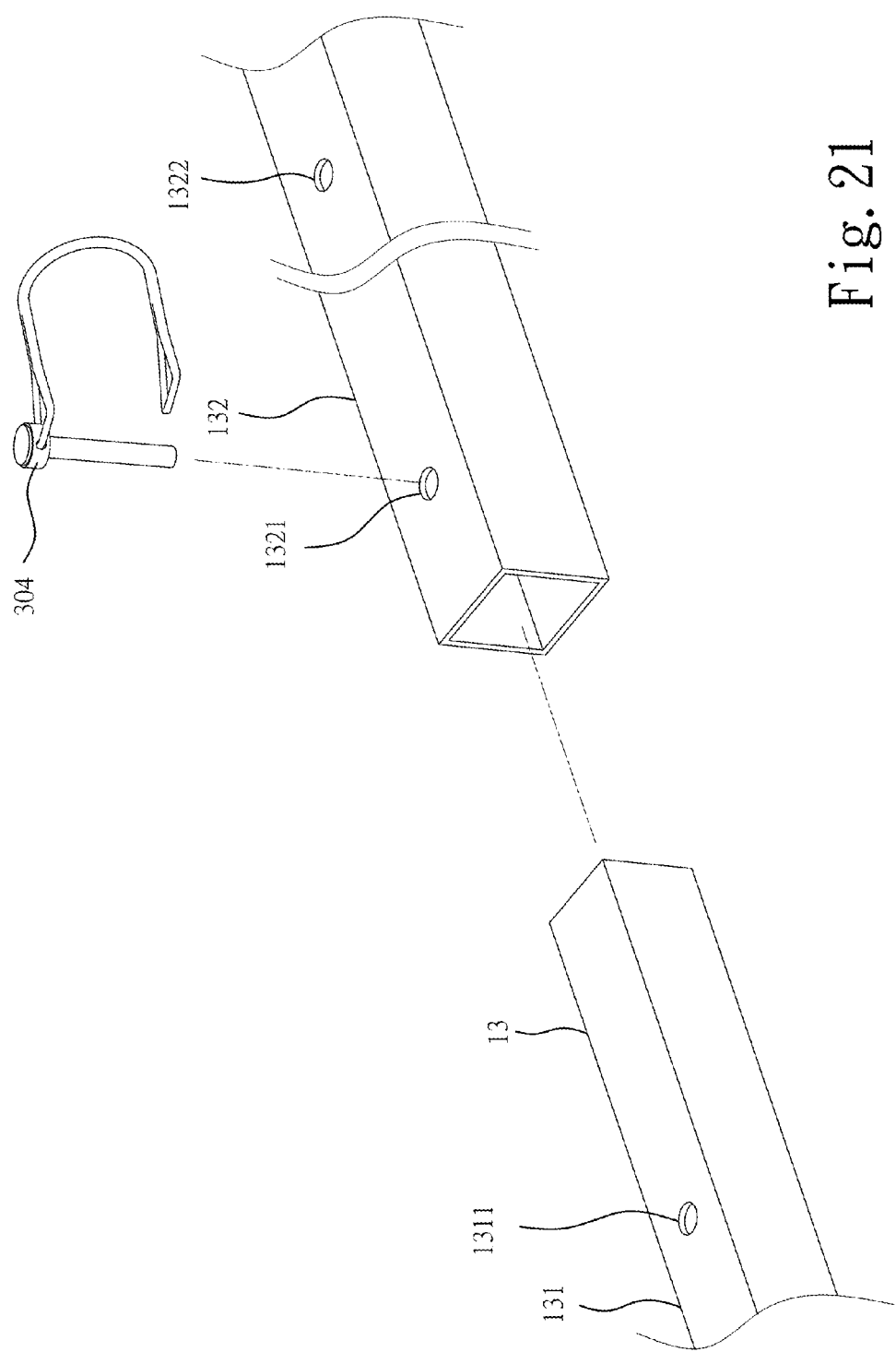
FIG. 21 is similar to FIG. 8, illustrating the use of a safety pin for the second locking device.
Figure 22:
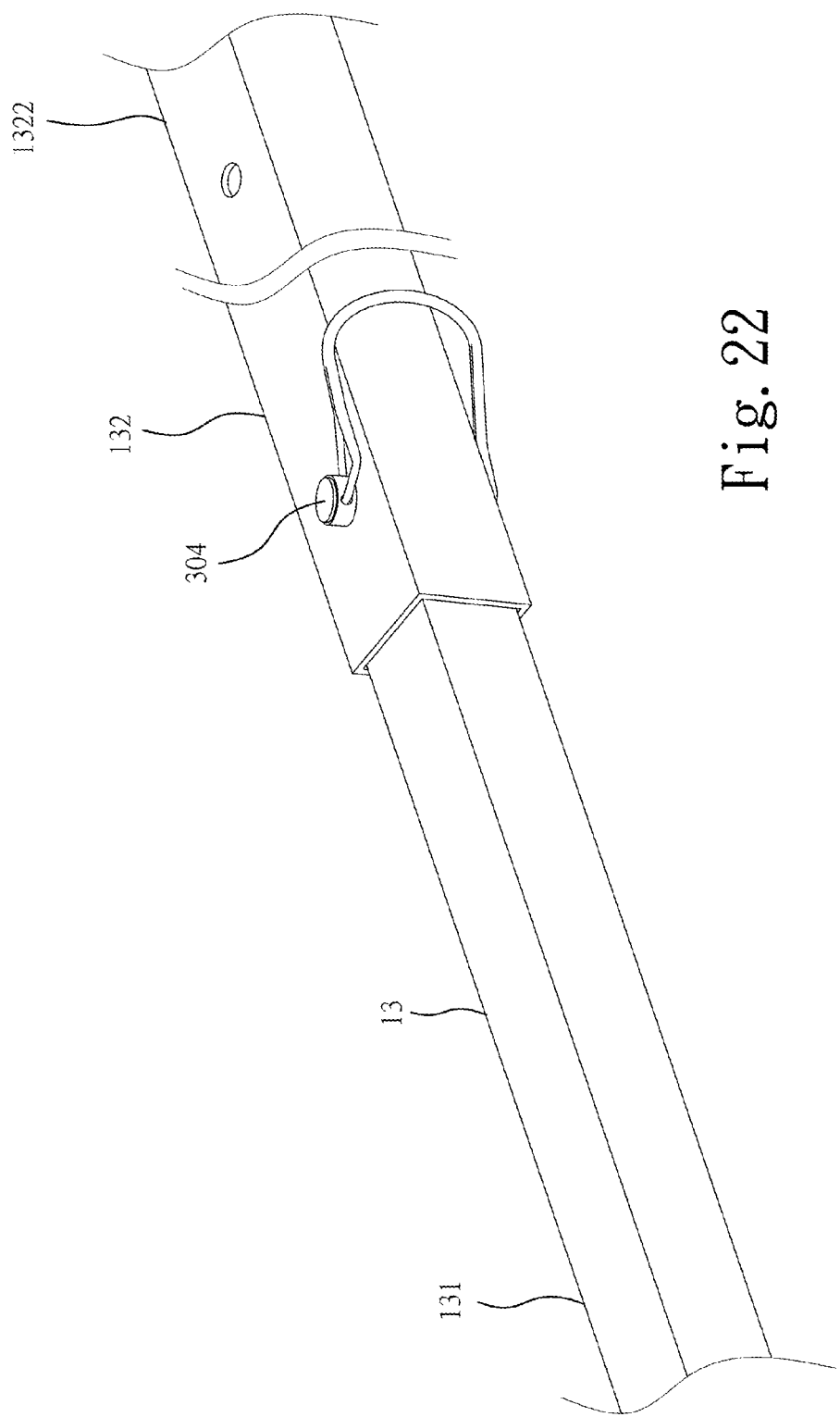
FIG. 22 is an assembly view of FIG. 21.

Further, as shown in FIG. 1 and FIGS. 6-12, each of the two opposite long sides of the rectangular open frame-shaped bottom frame 13 comprises an inner tube 131, an outer tube 132 sleeved onto and axially movable relative to the inner tube 131 between the extended position and the retracted position (see FIGS. 6-11), and a second locking device, for example, elastic positioning pin 3 for locking the inner tube 131 and the outer tube 132 in the extended or retracted position. The inner tube 131 comprises a transverse through hole 1311. The outer tube 132 comprises a first transverse through hole 1321 and a second transverse through hole 1322 spaced along the length thereof. The elastic positioning pin 3 is mounted in the inner tube 131, having its one end positioned in one side inside the inner tube 131 and its other end provided with a retaining rod 31 that is inserted through the transverse through hole 1311 of the inner tube 131 and engaged into the first transverse through hole 1321 or second transverse through hole 1322 of the outer tube 132 to lock the outer tube 132 and the inner tube 131 in the extended position (see FIG. 7) or retracted position (see FIG. 10). Alternatively, as shown in FIG. 19, the aforesaid second locking device can be a lock pin 30 inserted through the transverse through hole 1321 of the inner tube 13 and the first transverse through hole 1321 or second transverse through hole 1322 of the outer tube 132 to lock the outer tube 132 and the inner tube 131 in the extended or retracted position. Alternatively, as shown in FIG. 20, the aforesaid second locking device can be comprised of a screw bolt 301 and a nut 302, wherein the screw bolt 301 is inserted through the inserted through the transverse through hole 1311 of the inner tube 131 and the first transverse through hole 1321 or second transverse through hole 1322 of the outer tube 132, and then screwed up with the nut 202 to lock the outer tube 132 and the inner tube 131 in the extended or retracted position. Alternatively, as shown in FIGS. 20 and 21, the aforesaid second locking device can be a safety pin 304 inserted through the transverse through hole 131 of the inner tube 13 and the first transverse through hole 1321 or second transverse through hole 1322 of the outer tube 132 and then fastened thereto to lock the outer tube 132 and the inner tube 131 in the extended or retracted position. Further, a conventional quick-release device may be used to substitute for the aforesaid second locking device, achieving the same effect.

Figure 6:
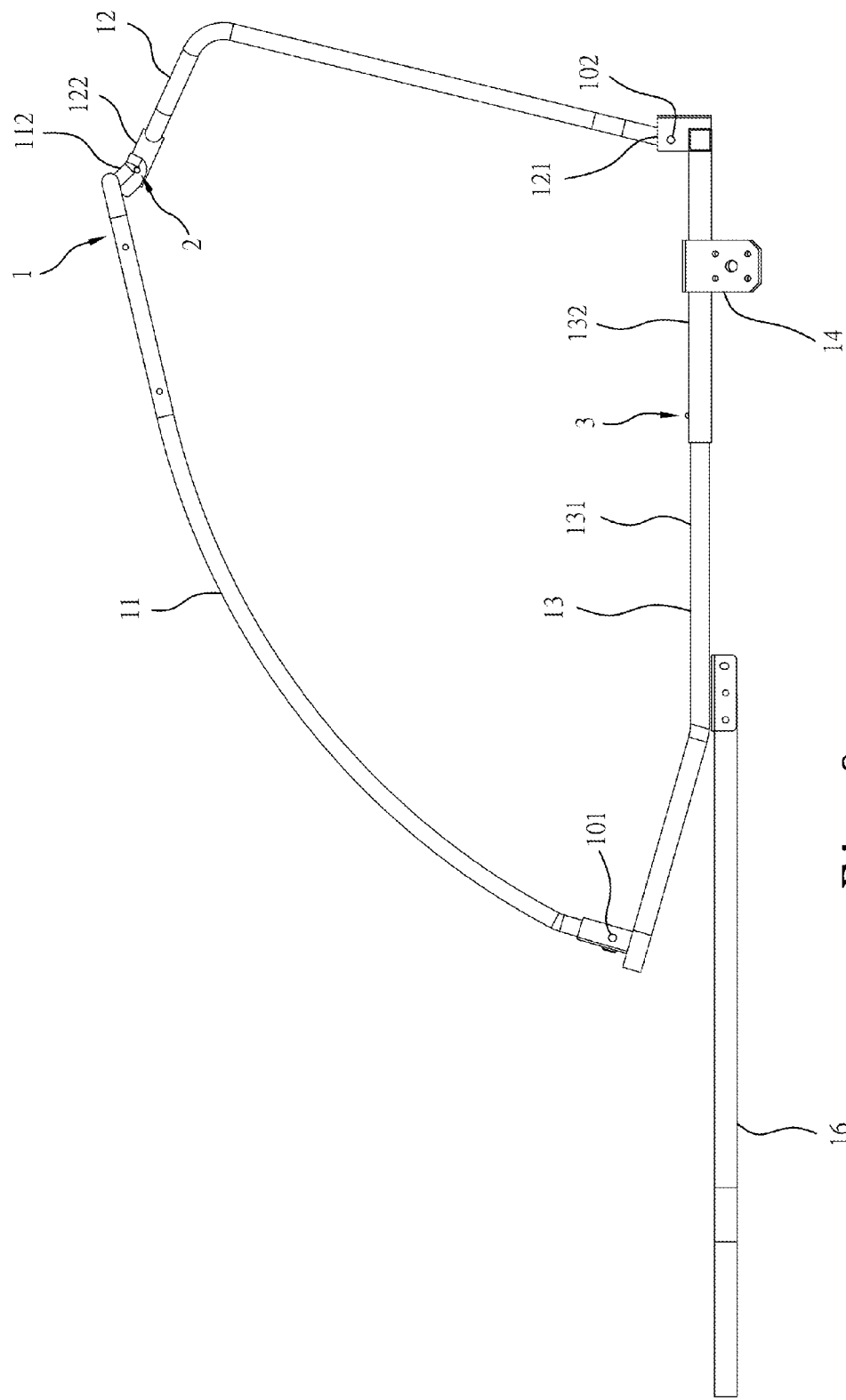
FIG. 6 is a side plain view of the present invention, illustrating the retractable frame structure for tandem trailer in the extended position.
Figure 7:
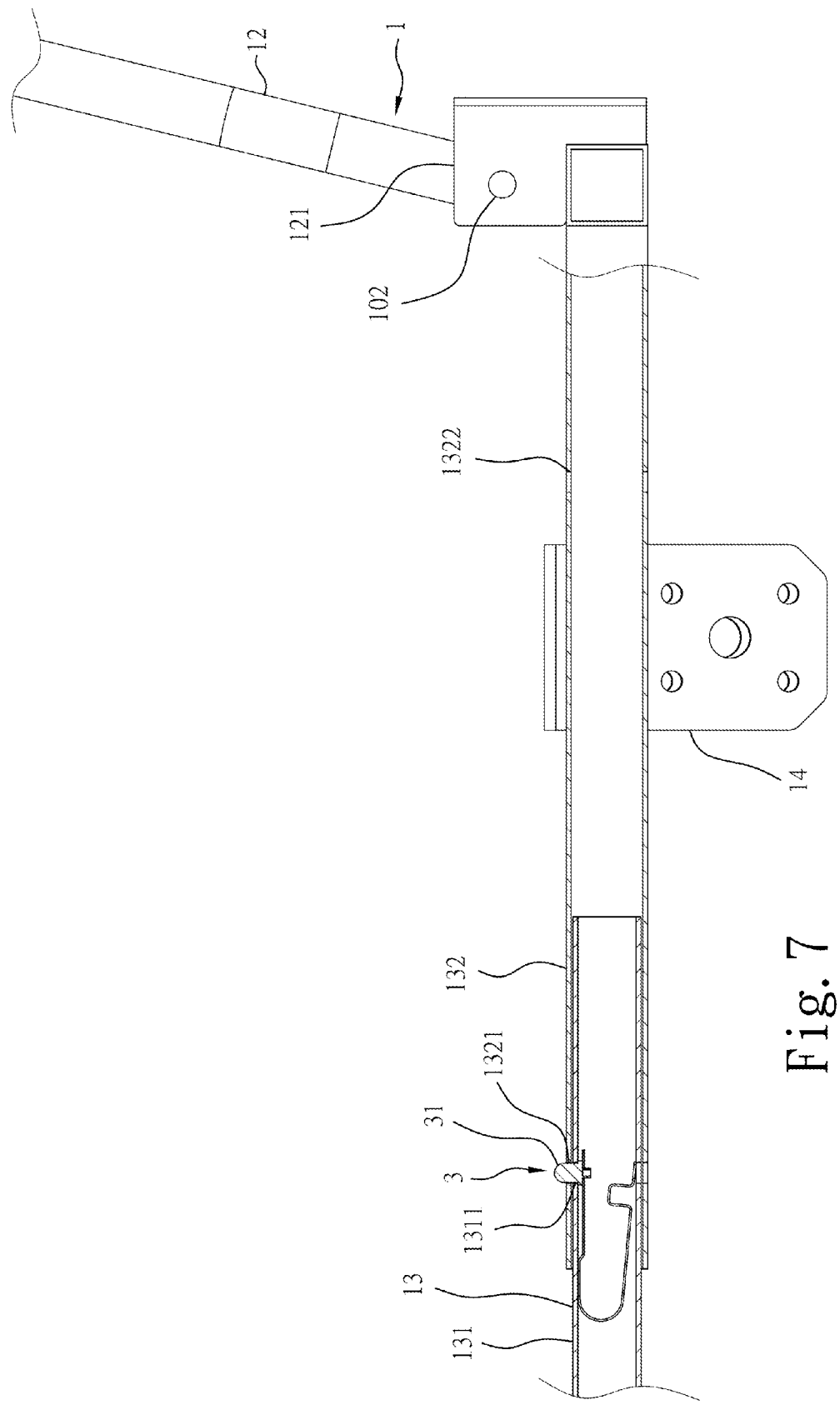
FIG. 7 is a sectional side view, in an enlarged scale, of a part of the retractable frame structure for tandem trailer in accordance with the present invention, illustrating the bottom frame locked in the extended position.
Figure 8:
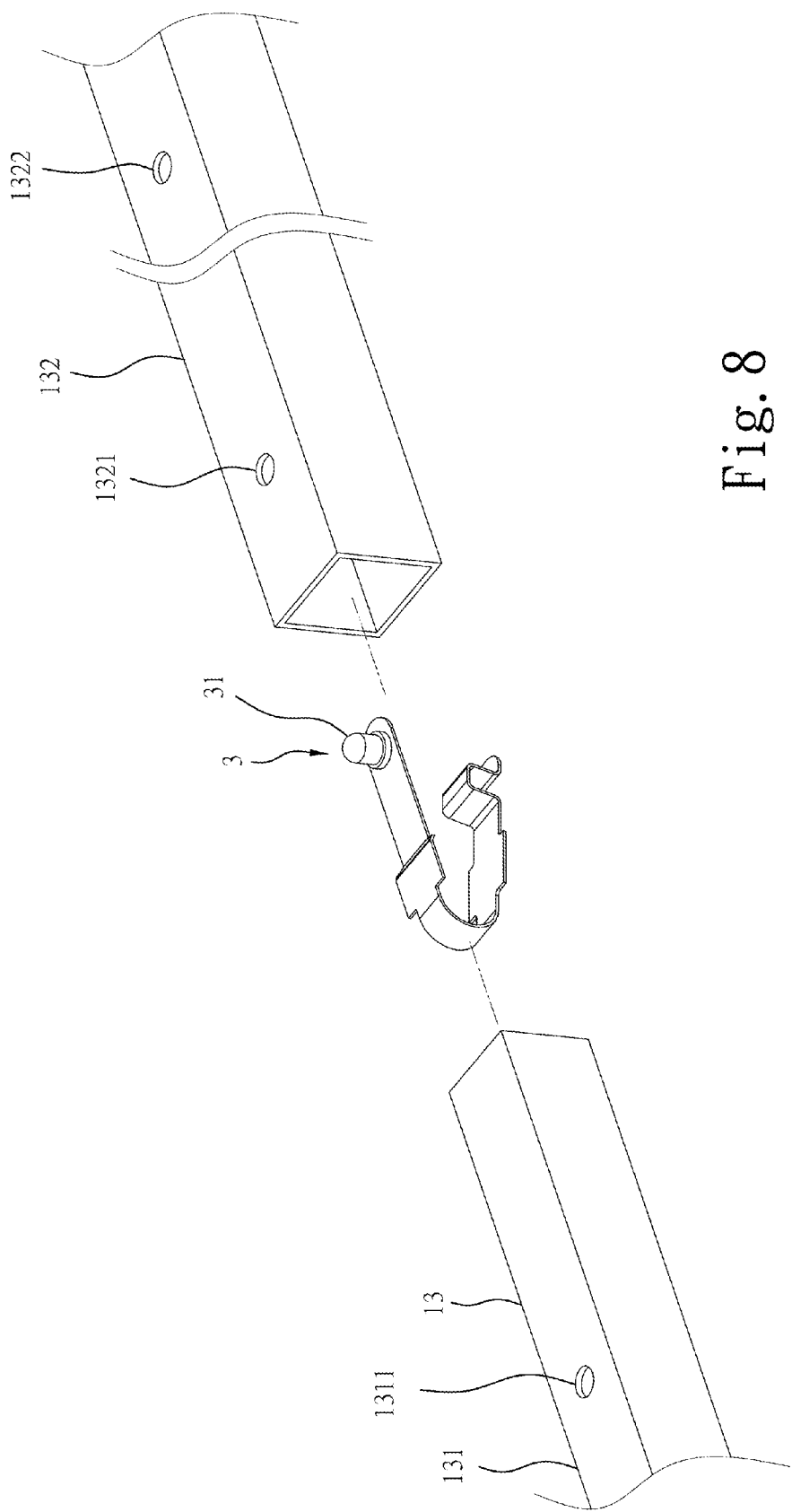
FIG. 8 is an exploded view, in an enlarged scale, of a part of the bottom frame of the retractable frame structure for tandem trailer in accordance with the present invention.
Figure 9:
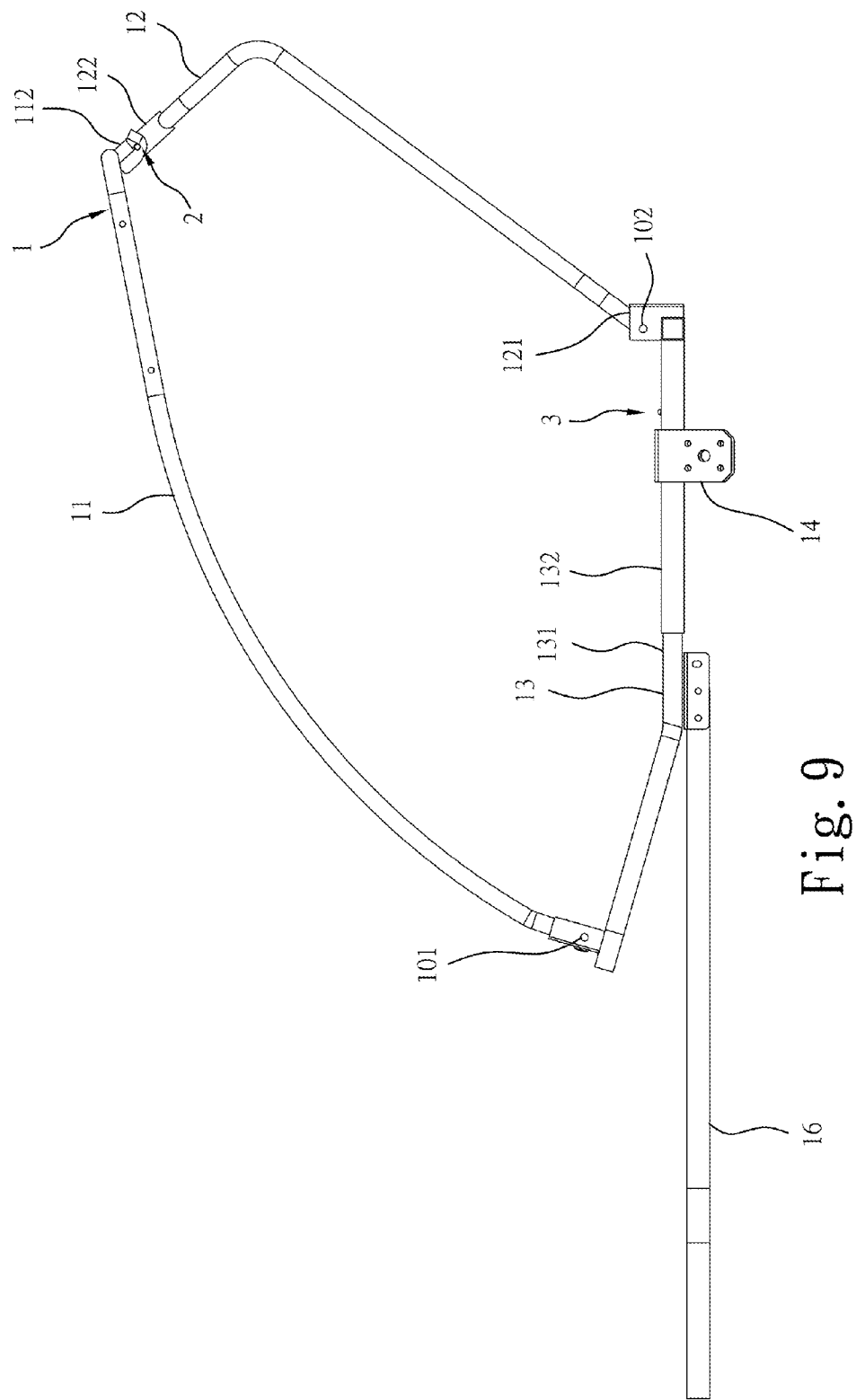
FIG. 9 is a side plain view of the present invention, illustrating the retractable frame structure for tandem trailer in the retracted position.
Figure 10:
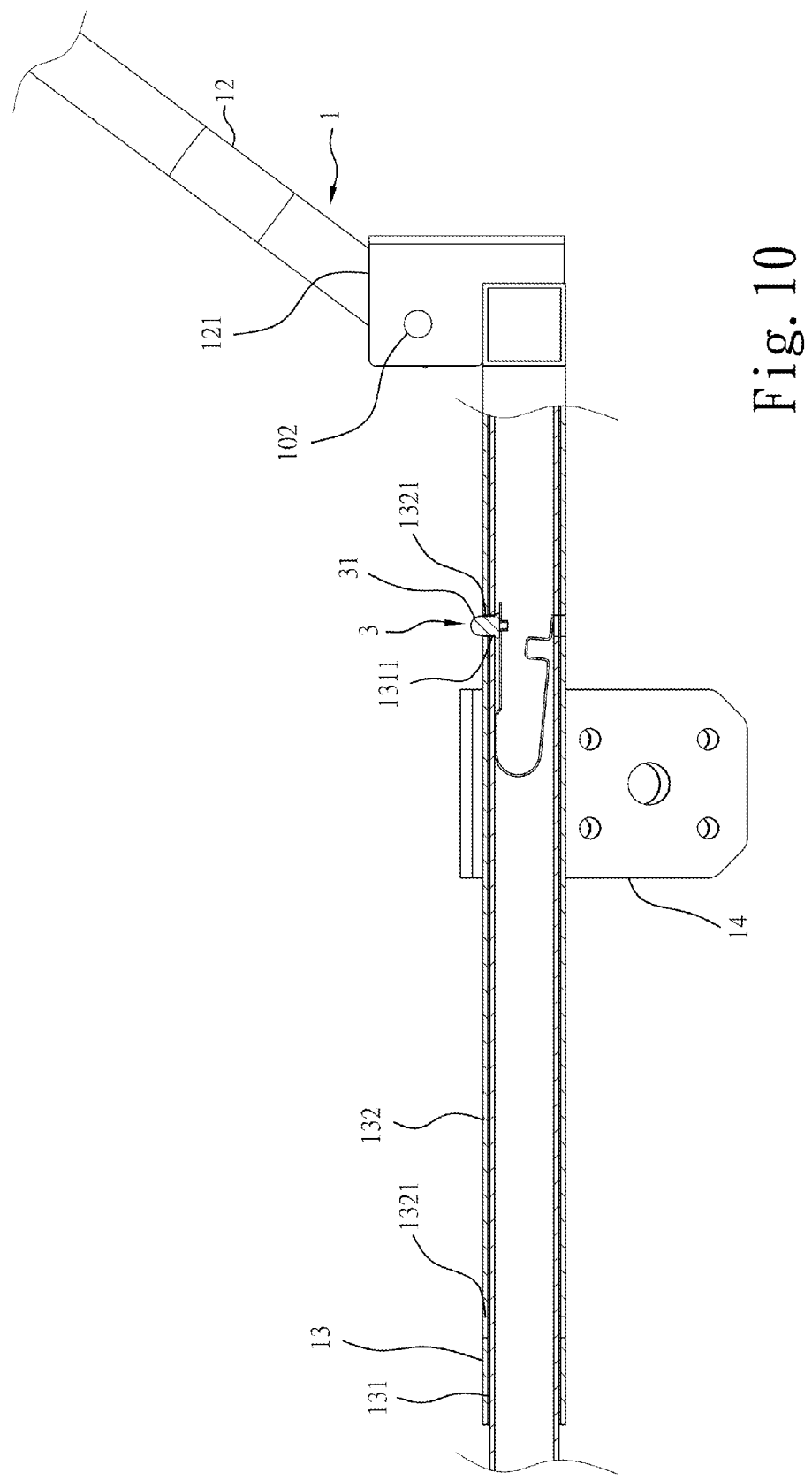
FIG. 10 is a sectional side view, in an enlarged scale, of a part of the retractable frame structure for tandem trailer in accordance with the present invention, illustrating the bottom frame locked in the retracted position.
Figure 11:
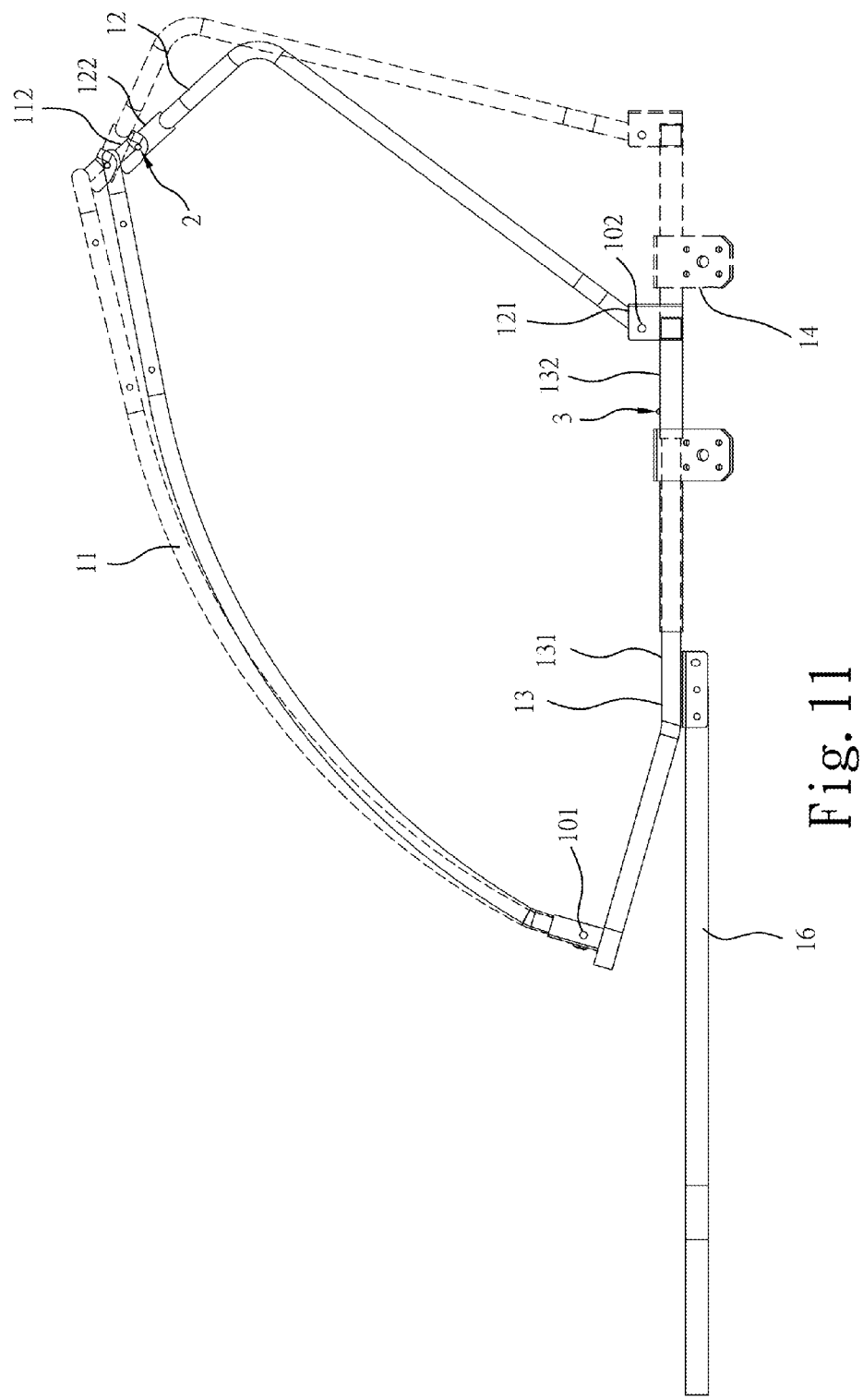
FIG. 11 is a schematic sectional view of the present invention, illustrating adjustment of the bottom frame of the retractable frame structure for tandem trailer between the extended position and the retracted position.
Figure 12:
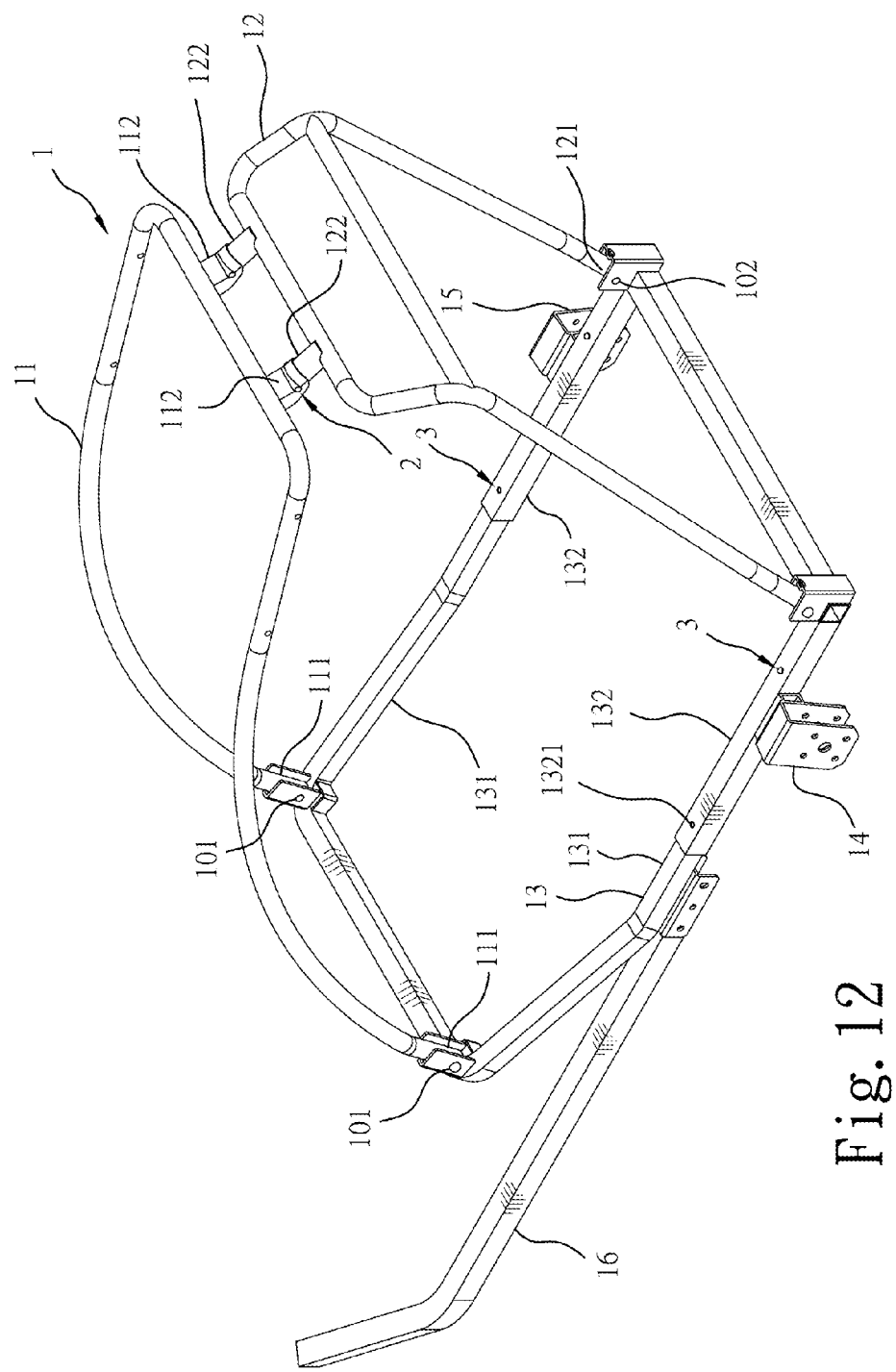
FIG. 12 is an oblique top elevation of the present invention, illustrating the retractable frame structure for tandem trailer in the retracted position.
Figure 13:
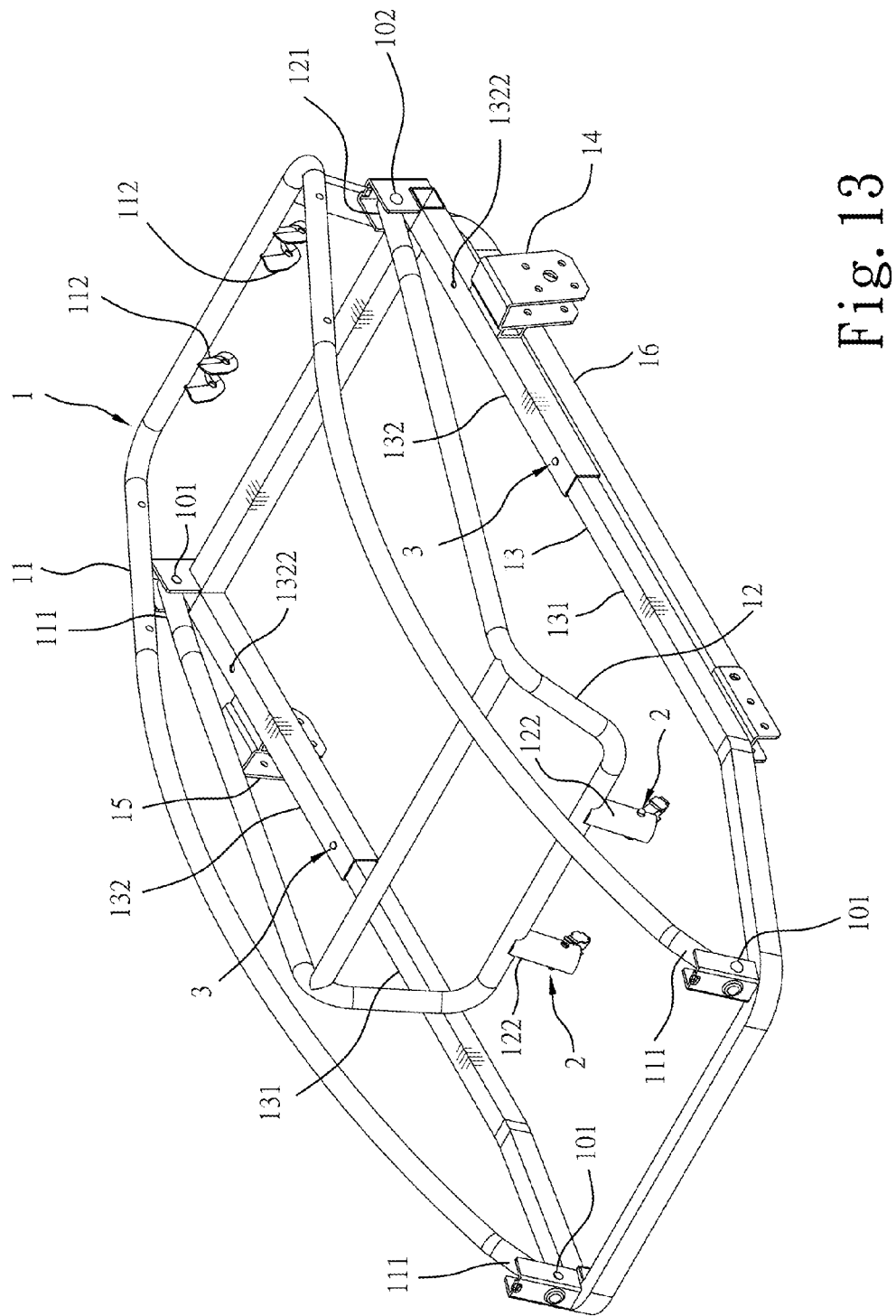
FIG. 13 is a top elevational view of the present invention, illustrating the retractable frame structure for tandem trailer collapsed.

By means of the aforesaid composition, when the respective second locking devices, for example, the retaining rods 31 of the elastic positioning pins 3 are respectively inserted through the transverse through holes 1311 of the respective inner tubes 131 and engaged into the first transverse through holes 1321 of the respective outer tubes 132 to lock the respective outer tubes 132 and the respective inner tubes 131 in the extended position, the retractable frame structure 1 is adapted for two-seat seating arrangement in a fore-to-aft manner (see FIG. 3 and FIG. 6). On the contrary, when the retaining rods 31 of the elastic positioning pins 3 are respectively disengaged from the first transverse through holes 1321 of the respective outer tubes 132 and engaged into the second transverse through holes 1322 of the respective outer tubes 132 to lock the respective outer tubes 132 and the respective inner tubes 131 in the retracted position, the retractable frame structure 1 is adapted for one-seat seating arrangement (see FIG. 9 and FIG. 12). Further, if safety pins 304, lock pins 30, screw bolts 301 and nuts 203, or quick-release devices are used for the second locking devices, these equivalent locking devices can also selectively lock the bottom frame 3 in the extended position for two-seat seating arrangement in a fore-to-aft manner, or the retracted position for one-seat seating arrangement. Further, when going to collapse the retractable frame structure 1, unlock the first locking devices, for example, elastic positioning pins 2, and then bias the front frame 11 and the rear frame 12 inwardly toward the bottom frame 13 to let the front frame 11 and the rear frame 12 be closely received to the bottom frame 13 (see FIG. 13), and then bias the trailer bar 16 backwardly toward the bottom frame 13 to let the trailer bar 16 be received to the bottom side of the bottom frame 13 (the collapsible arrangement of the trailer bar is of the known art, no further description in this regard is necessary). Thus, the dimension of the retractable frame structure 1 is greatly reduced when it is collapsed, convenient for packing, delivery or storage.

Further, after fabrication of the retractable frame structure 1, seat canvass or like means can be installed in the retractable frame structure 1 for sitting. As the seating structure is not within the scope of claims of the present invention, no further detailed description in this regard is provided.

In conclusion, the invention provides a tandem trailer frame structure which has the advantages and features as follows:

1. The bottom frame 13 of the retractable frame structure 1 can be adjusted between an extended position for two-seat seating arrangement in a fore-to-aft manner and a retracted position for one-seat seating arrangement.
2. When the tandem trailer is not in use, the front frame 11 and rear frame 12 of the retractable frame structure 1 can be collapsed and received to the bottom frame 13 to reduce the dimension of the tandem trailer convenient for packing, delivery or storage.

What is claimed is:

1. A retractable frame structure for a tandem trailer, comprising a front frame, a rear frame, a bottom frame, two wheel brackets respectively bilaterally mounted at said bottom frame near a rear side thereof for supporting a respective wheel, and a trailer bar pivotally connected to one lateral side of said bottom frame near a front side thereof for coupling to a bicycle, wherein:
said front frame has respective bottom ends of two side bars thereof respectively pivotally connected to two distal ends of a front side of said bottom frame by a respective pivot member, and a top side thereof pivotally connected to said rear frame;
said rear frame has respective bottom ends of two side bars thereof respectively pivotally connected to two distal ends of a rear side of said bottom frame by a respective pivot member, and a top side thereof pivotally connected to the top side of said front frame;
said bottom frame is a substantially rectangular open frame retractable longitudinally back and forth between an extended position defining a relatively greater accommodation space for two-seat seating arrangement in a fore-to-aft manner and a retracted position defining a relatively smaller accommodation space for one-seat seating arrangement,
wherein said front frame comprises at least one coupling portion located on the top side thereof; said rear frame comprises at least one coupling portion located on the to side thereof and respectively detachably connected to the at least one coupling portion of the front frame,
wherein said at least one coupling portion of said front frame comprises two opposite sidewalls and a through hole located on each said sidewall; said at least one coupling portion of said rear frame comprises an axial hole, at least one transverse through hole extending across said axial hole, and an elastic positioning pin mounted in said axial hole, said elastic positioning pin having one end thereof positioned in one side inside the respective coupling portion of said rear frame and an opposite end thereof provided with a retaining rod that is inserted through one transverse through hole of the respective coupling portion of said rear frame and engaged into the through hole on one sidewall of the respective coupling portion of said front frame.

2. The retractable frame structure for the tandem trailer as claimed in claim 1, wherein said front frame comprises at least one first locking device adapted for locking the at least one coupling portion of said rear frame to the at least one coupling portion of said front frame.

3. The retractable frame structure for the tandem trailer as claimed in claim 2, wherein said at least one first locking device is selected from the group of an elastic positioning pin, a safety pin, a lock pin, a quick-release device, a screw bolt and nut set, and a rivet.

4. The retractable frame structure for the tandem trailer as claimed in claim 1, wherein said bottom frame is a rectangular open frame having two opposing long sides, each said long side comprising an inner tube and at least one outer tube sleeved onto and axially movable relative to said inner tube between said extended position and said retracted position.

5. The retractable frame structure for the tandem trailer as claimed in claim 4, wherein the inner tube of each long side of said bottom frame comprises a transverse through hole, each outer tube of each long side of said bottom frame comprises a first transverse through hole and a second transverse through hole spaced along the length thereof; said bottom frame further comprises at least one second locking device mounted in the inner tube of each long side of said bottom frame for selectively locking the at least one outer tube of the respective long side to the inner tube of the respective long side of said bottom frame in one of said extended position and said retracted position.

6. The retractable frame structure for the tandem trailer as claimed in claim 5, wherein each said second locking device is selected from the group of an elastic positioning pin, a safety pin, a lock pin, a quick-release device, a screw bolt and nut set, and a rivet.

* * * * *